UNITED STATES PATENT OFFICE.

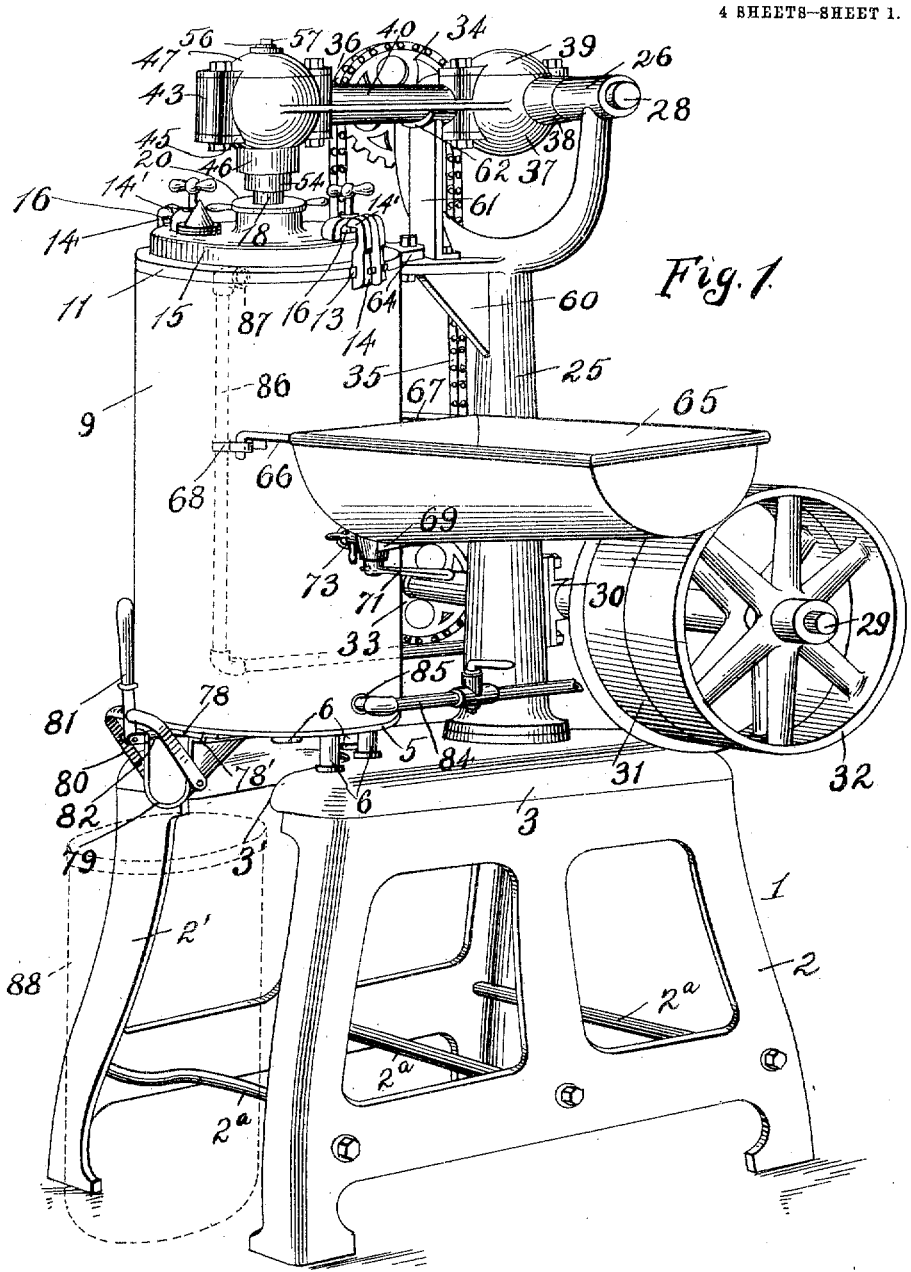

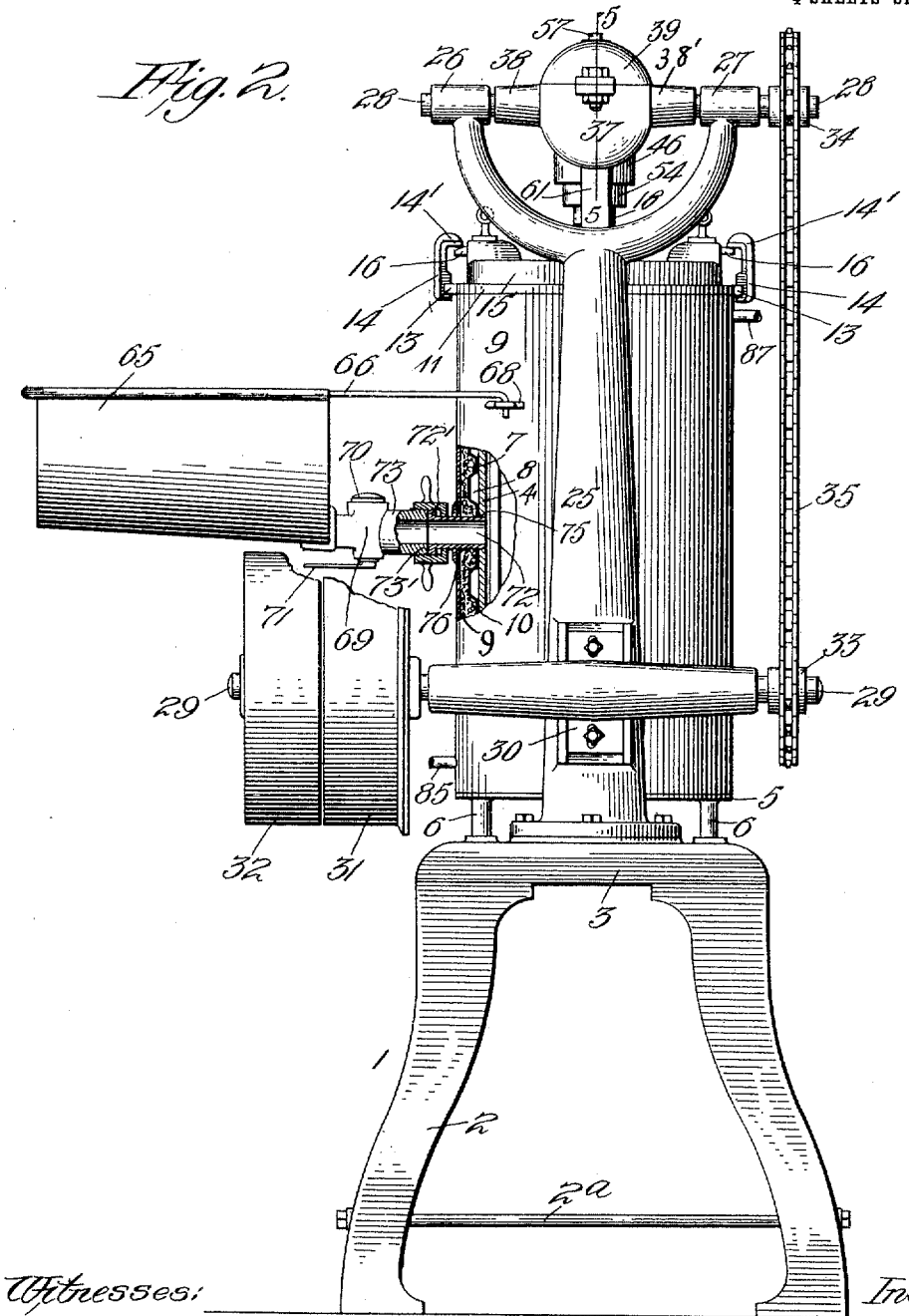

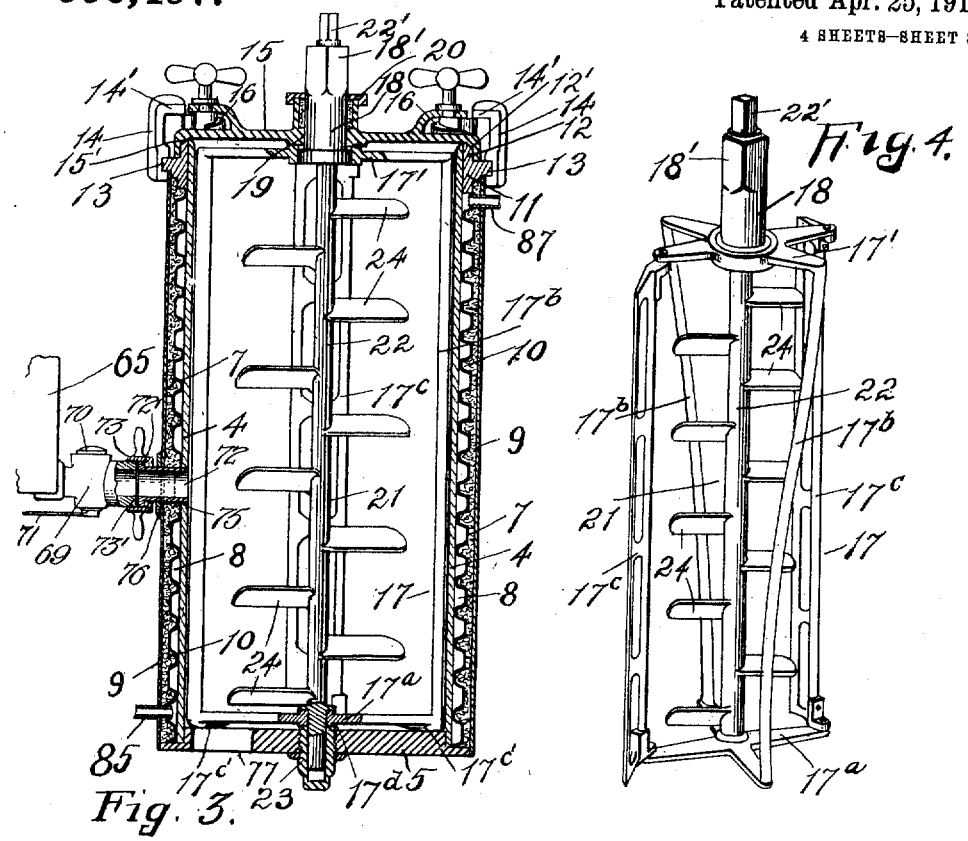

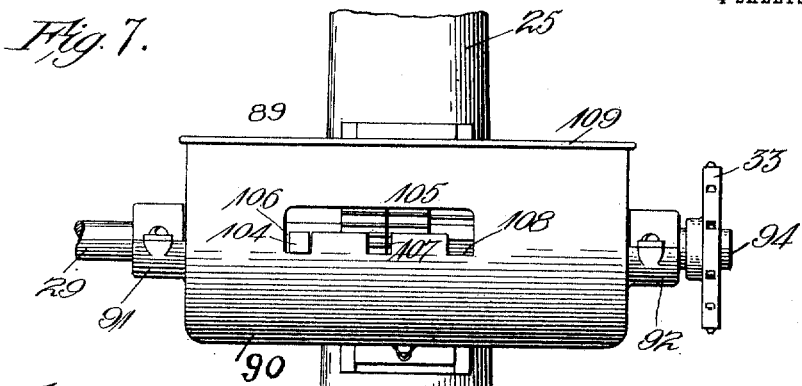
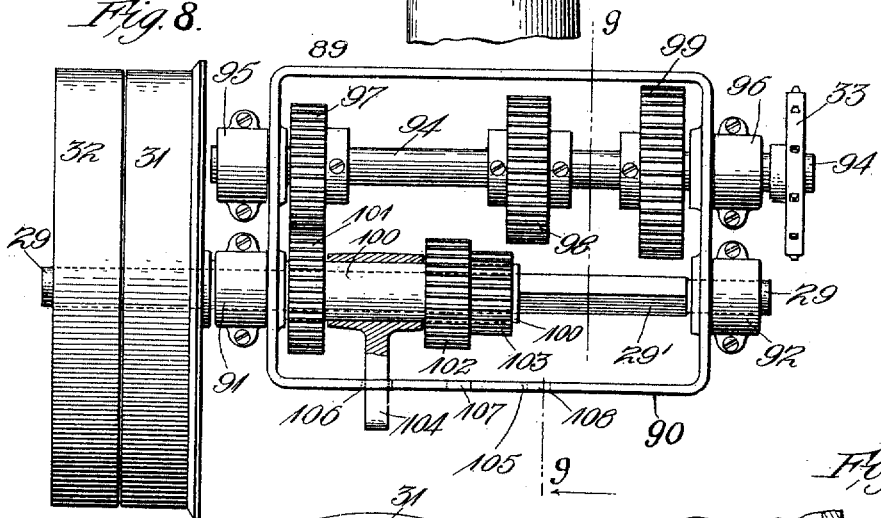
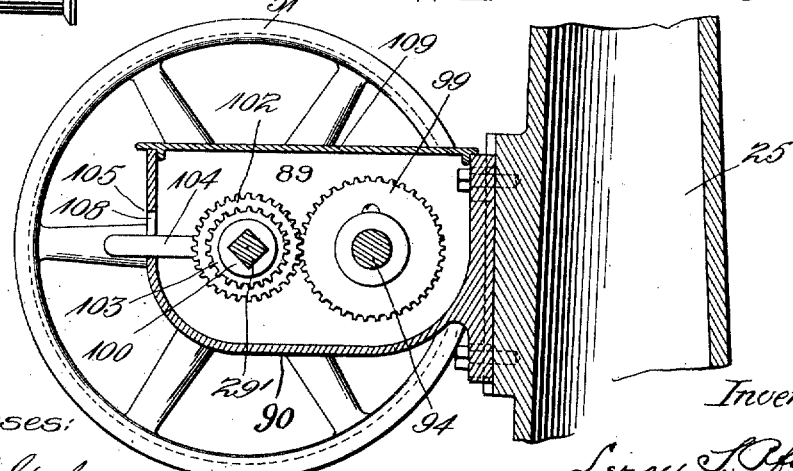

LEROY S. PFOUTS, OF CANTON, OHIO, ASSIGNOR TO THE MILLER PASTEURIZING MACHINE COMPANY, OF CANTON, OHIO, A CORPORATION OF NEW JERSEY.

ICE-CREAM FREEZER.

990,497.

Specification of Letters Patent.  Patented Apr. 25, 1911.

Application filed January 31, 1908. Serial No. 413,648.

*To all whom it may concern:*

Be it known that I, LEROY S. PFOUTS, a citizen of the United States, residing at Canton, in the county of Stark and State of Ohio, have invented certain new and useful Improvements in Ice-Cream Freezers, of which the following is a specification, reference being had therein to the accompanying drawings.

This invention relates to improvements in ice cream freezers.

It pertains essentially to the class of ice cream freezers having vertically disposed freezing cylinders.

One object of my invention is to provide a simple, inexpensive and convenient means of filling the freezing cylinder with the mixture to be treated, said filling means including a batch vat or tank within easy reach and access of an operator standing at the freezer.

Another object of my invention is to provide power transmitting mechanism connected with the agitating and scraping devices within the freezing cylinder at the top thereof and connected by belting, or its equivalent, with the source of power at a lower point in such manner that, in operation, the pull of the belting on the machine will not tend to topple over the freezing cylinder.

Other objects of my invention will be obvious from the description and disclosure herein made of an illustrative embodiment of it.

Figure 1 is a perspective view of an ice cream freezer embodying my invention. Fig. 2 is a view partly in rear elevation, and partly in section, of the same. Fig. 3 is a longitudinal vertical central section of the freezing cylinder, a portion of the batch tank also being shown. Fig. 4 is a perspective view of the agitating and scraping mechanism, detached. Fig. 5 is a section on the line 5—5, Fig. 2. Fig. 6 is a fragmentary sectional view through the lower end of the freezing cylinder, the discharge valve and the discharge spout. Figs. 7, 8 and 9 illustrate the changeable speed gearing for the driving mechanism.

In the drawings—1 indicates a suitable base or supporting frame. It preferably consists of two side frame members, 2, 2' and a platform or top plate 3 secured on said side frame members.

2ª are cross-bars connecting the side frame members together near their lower ends and holding them suitably spaced apart.

The top plate 3 is recessed at 3' to accommodate the discharge spout and valve mechanism to be hereinafter described, and to permit ready access to the bottom of the freezing cylinder.

4 is a freezing cylinder vertically disposed upon the top plate 3. At its lower end it has a head 5 which rests upon, is suitably secured to and supported by relatively short uprights or standards 6 carried by the top plate 3 of the frame. These standards support the freezing cylinder at a suitable distance above the top plate 3 of the frame to permit ready access to the cylinder head 5 both for cleaning purposes and adjustment and manipulation of the parts at the lower end of the freezing cylinder. The freezing cylinder 4 is preferably surrounded by a cooling medium circulating chamber. For the purpose of illustration I have shown this to be formed by a helically grooved cylinder 7 snugly fitted to the freezing cylinder 4 and forming with the outer wall of the latter a helical passageway 8 for brine or other suitable cooling medium.

9 is an external jacket for the freezing cylinder. It is preferably made of sheet metal and has interposed between it and the helically corrugated cylinder 7 an insulating jacket or filling 10 of material having relatively low heat conductivity, such for example, as ground cork.

11 is a ring or collar fitted to the upper end of the freezing cylinder 4. It has an upwardly extending flange 12, the upper free edge of which is preferably beveled, as shown at 12'. This ring 11 carries at diametrically opposite points, outward extensions or lugs 13, each of which has secured to it an upwardly extending bracket or clamp arm 14, having an inwardly turned lip 14'.

15 is a detachable head for the upper end of the freezing cylinder 4. It carries at diametrically opposite points a pair of rotatable clamping cams 16, each one of which is adapted to engage with the inner wall of a lip 14' on one of the clamping arms 14. When turned in one direction, each of these clamping cams tends to clamp the head 15 to the collar 11, the head having a beveled seat at 15' to engage the beveled edge 12' of the flange 12 on the collar. When turned in the opposite direction, the clamping cams release the detachable head 15 from the collar 11.

Any suitable agitating and scraping mechanism may be employed within the freezing cylinder 4. For the purpose of illustration I have shown such a mechanism of the well known type having inner and outer oppositely rotatable parts.

17 represents the outer part of the agitating and scraping mechanism. It comprises a pair of four-arm spiders 17', 17$^a$, two material-propelling and ejecting blades 17$^b$, 17$^b$, and two pivotally mounted scrapers 17$^c$, 17$^c$.

18 is a hollow shaft connected to the spider 17' and extending upwardly and out through an axially disposed bearing 19 in the head 15, and has a squared end 18'.

20 is a stuffing box for the bearing 19.

21 indicates the inner part of the agitating device. It comprises an axially disposed shaft 22, extending at its upper end through the hollow shaft 18 and extending at its lower end through the spider 17$^a$ and into a detachable thrust bearing 23, fitted into the fixed head 5 of the freezing cylinder.

24 are beater blades spirally disposed about and carried by the shaft 22. They are arranged to impart an upward movement to the material with which they engage in the freezing cylinder.

The upper end of the shaft 22 is squared, as indicated at 22'. The spider 17$^a$ carries an axially disposed washer or thrust plate 17$^d$ which is arranged to rest upon the upper end of the thrust bearing 23. On its underside this spider 17$^a$ also carries scraper fins or blades 17$^{c'}$, which are arranged to scrape off any material which may collect on the head 5 and move it away from the axis of the cylinder.

25 is an upright or standard secured to the platform 3 in the rear of the freezing cylinder. At its upper end it is bifurcated, one arm carrying a horizontally disposed bearing 26, and the other a horizontally disposed bearing 27, in alinement with the bearing 26.

28 is a counter shaft mounted in the bearings 26 and 27.

29 is the main drive shaft on the apparatus. It is mounted parallel to the shaft 28 in a bearing 30 carried by the standard 25.

31, 32 are belt pulleys, one fast and the other loose on one end of the shaft 29. 33 is a sprocket wheel suitably secured to the other end of the main shaft 29.

34 is a sprocket wheel secured to the shaft 28 and in alinement with the sprocket wheel 33.

35 is a driving chain connecting the sprocket wheels 33 and 34.

36 is a swinging transmission gear frame. At its rear end it has a parti-spherical chamber 37 with laterally extending hollow arms 38, 38' loosely mounted upon the counter-shaft 28.

39 is a cap or cover for the chamber 37.

40 is a bearing arm extending forward from the chamber 37 and having adjacent to the latter a horizontal bearing 41, and near its front end a bearing 42 in longitudinal alinement with the bearing 41. In front of the bearing 42 the arm 40 is expanded, as indicated at 43 and vertically recessed to form part of a gear chamber 44, preferably spherical in shape. The lower part of the said chamber 44 is formed by a concavo-convex plate 45 detachably secured to the expanded part 43 of the swingable frame 36 and having a vertically and axially disposed bearing 46.

47 is a cover plate or head arranged upon and detachably secured to the expanded part 43 of the frame 36, and having a vertically and axially disposed bearing 48 in longitudinal alinement with the bearing 46.

49 is a shaft mounted in the bearings 41 and 42 in the swingable frame 40.

50 is a bevel gear secured to the rear end of the shaft 49 and in mesh with a bevel gear 51 secured to the counter shaft 28.

52 is a bevel gear secured to the front end of the shaft 49.

53 is a bevel gear in mesh with the bevel gear 52 and secured to or formed integral with a hollow shaft 54 mounted in the bearing 46 in the swingable frame. The passageway through the shaft 54, near its lower end, is enlarged and made square to receive the squared end 18' of the shaft 18 of the agitating mechanism.

55 is a bevel gear in mesh with the bevel gear 52 and secured to or formed integral with a hollow shaft 56 mounted in the bearing 48.

57 is a shaft loosely mounted at its lower end in the shaft 54 and having a squared recess 57' arranged to receive the squared end 22' of the shaft 22 of the agitating mechanism. This shaft 57 extends up through the bevel gears 53 and 55 and the hollow shaft 56 and is suitably secured to the latter, as by a pin 58.

59 is a spacing block surrounding the shaft 57 and interposed between the bevel gears 53 and 55.

60 is a forwardly extending bracket carried by the standard 25.

61 is an upright or support carried by the bracket 60 and having at its upper end a concave rest 62 arranged to receive and support the arm 40 of the swingable frame 36, when the latter is in working position. The collar or ring 11 is provided with a rearwardly extending lug 64 which is bolted or otherwise secured to the bracket 60, thus rigidly holding the upper end of the freezing cylinder in position.

65 is a batch tank or vat to receive the mixture to be treated and direct it into the freezing cylinder. This tank preferably extends laterally from the freezing cylinder and is arranged intermediate the upper and lower ends thereof at a height above the floor or support for the frame 1 which will make it within easy reach of the operator, so that he can stand upon the said floor or support and readily pour the mixture in the batch tank. The batch tank may be supported in position in any suitable manner. For illustration, I have shown it provided at either side of its top with arms or rods 66, 67, having their free ends bent down to enter openings in cleats or brackets 68 carried by the cylinder 9. From the lower-most end of the batch tank extends a feed duct 69 in which is arranged a suitable valve 70.

71 is an operating handle for the valve.

72 is an inlet duct for the freezing cylinder 4. It is arranged intermediate the ends of the said cylinder and preferably about midway between them. When the cylinder is surrounded by a circulating coil for cooling medium, I have found it desirable to form and position this duct, as shown in Figs. 2, and 3. This duct 72 is formed of a pipe having one end jumped up or flanged, as indicated at 72', to retain upon it one part 73' of a coupling 73. The inner end of this pipe 72 is inserted into an opening 75 through the cylinder 4 and the pipe is preferably soldered to the said cylinder. The pipe is also inserted through an opening 76 in the helically corrugated cylinder 7. This opening has its center in the center of one of the grooves of said cylinder 7 and extends but a short distance at either side of said groove, so that when the pipe 72 is in position it will take up but a small space of each of two adjoining convolutions of the helical passageway. This pipe may be suitably soldered to the cylinder 7 and also to the jacket 9 through which it extends. The end of the duct 69 leading from the batch tank 65 is screw threaded to receive the screw threaded end of the coupling 73.

77 is a discharge opening through the cylinder head 5 and preferably adjacent to the inner walls of the freezing cylinder 4. Any suitable valve mechanism may be employed for controlling this discharge opening. For illustration, I have shown a horizontally reciprocable slide or valve 78 mounted at either side in guide ways 78' in a discharge nozzle or spout 79, suitably secured to the cylinder head 5 and around the discharge opening therethrough.

80 is a U-shaped bar or lever having each of its free ends pivotally connected to the adjacent wall of the discharge spout 79.

81 is an operating handle suitably connected intermediate of its ends to the lever 80 and having its lower end pivotally connected to the front end of a link 82, the rear end of which link is pivotally connected to a downwardly extending lug 83 on the slide or valve 78.

The cooling medium may be conducted to and from the circulating passageway 8 in any suitable manner. For the purpose of illustration I have indicated a supply pipe 84 suitably connected to a cooling medium inlet duct 85 and a return pipe 86 suitably connected to a discharge duct 87.

In operation, a quantity of the mixture to be treated is introduced into the tank 65. The valve 70 is then operated to permit the mixture to flow into the interior of the freezing cylinder 4, which it does under the action of gravity. The cooling medium is then caused to circulate through the tortuous passageway 8 around the freezing cylinder, and power is applied through the fast pulley 31 on the main shaft 29 to drive the agitating and scraping mechanism within the freezing cylinder. When the mixture has been treated for a sufficient length of time and is in proper condition for discharging from the freezing cylinder, the operator places a receptacle 88, as indicated in dotted lines in Fig. 1, beneath the discharge spout 79, and then presses downwardly upon the handle 81, drawing outwardly the valve 78 and permitting the discharge of material from the freezing cylinder. The discharge of this material is facilitated by the conveyer-like or ejector action of the material-whipping and propelling blades 17$^b$, which tend, when in operation, to move material with which they engage, toward the discharge end of the cylinder. The beater blades 24 on the central shaft 22 of the agitating mechanism, are preferably spirally disposed and operated in such manner as to tend to drive the material with which they engage upward and outward. The combined action of these blades 24 and the blades 17$^b$, is such as to effect a very thorough whipping and beating of the material within the freezing cylinder.

Ease and speed of operation are essential in ice cream freezers of this class which are especially intended for producing large quantities of ice cream for commercial purposes. I have found it desirable that the freezing cylinder be so arranged as to permit relatively large receiving and congealing receptacles to be placed beneath its discharge opening. Where this is done, the upper end of the freezer is necessarily quite a distance above the floor or support for the freezer. With all of the earlier ice cream freezers having vertically disposed freezing cylinders, of which I am aware, the batch tank or supply tank has been arranged above the upper end of the cylinders, at such a distance from the floor or support for the freezing cylinder as to make its filling inconvenient for an operator, in fact, to the best of my knowledge, the operator has had to have a ladder or something to stand upon in order to conveniently pour a batch of mixture into the batch tank and especially, if he wanted to see the condition of the interior of the batch tank. In the improvements which I have made and herein disclosed, the batch tank is at all times within convenient reach of the operator standing on the floor which supports the ice cream freezer. He can readily see into the batch tank at all times and note its condition, or the condition of the batch of material in it without leaving the floor in order to do so. By a mere glance he can note the complete discharge of a batch of material from the tank into the freezing cylinder.

The batch tank 65 should be arranged sufficiently above the bottom head 5 of the cylinder to insure the introduction into the freezing cylinder, under the action of gravity, of enough material to substantially fill the interior of the freezing cylinder after it has been properly treated. As with freezers of this type the yield of frozen or partly frozen material is in volume substantially twice that of the material as supplied to the cylinder, the batch tank may be arranged so as to fill the freezing cylinder about one-half full at a charge. It will be understood that this relation of the batch tank to the freezing cylinder may be varied to suit the different conditions which have to be dealt with.

Any pull of the power transmitting belt on the driving pulley 31, when the apparatus is in operation, is applied considerably beneath the top of the freezing cylinder and of the apparatus as an entirety, and sufficiently near its center of gravity to preclude the possibility of toppling or tending to topple over the machine. With such a construction I find that the agitating and scraping mechanism within the freezing cylinder, and the power transmitting devices connected to it, run very smoothly and quietly and without vibration.

It will be understood that the ice cream freezer herein shown and described is but one form in which my invention may be embodied. It will be obvious, to one skilled in the art, that my improvements may be employed in numerous different forms.

In order to remove the agitating and scraping mechanism for the purpose of cleaning both it and the interior of the freezing cylinder, the front end of the frame 43 should be swung upwardly and rearwardly, thereby disconnecting the power transmitting mechanism from the agitating and scraping mechanism. The head 15 is then removed and the scraping and agitating mechanism may be lifted upwardly and out of the freezing cylinder. This may be done without dismantling or in anywise disturbing the batch or supply tank 65.

The chambers in which the bevel gears at the front and rear end of the swingable frame 43 operate, may be filled with a suitable lubricant.

In some instances I have found it advisable to provide the apparatus with a system of change speed gearing to enable the operator to easily and quickly vary the speed of rotation of the agitating mechanism relative to the speed of rotation of the main drive shaft 29. This is for the purpose, primarily, of adjusting the speed of operation of the agitating mechanism in accordance with the nature of the mixture in the freezing cylinder to be treated and the kind of frozen mixture which it is desired to make.

In Figs. 7, 8 and 9 I have shown a suitable change speed gear 89. 90 is a gear case suitably secured to the standard 25, preferably at the same place provided for the bearing 26 heretofore described. This case is vertically adjustable to permit of taking up slack in the drive chain 35. The main shaft 29 in this construction is mounted in suitable bearings 91, 92 on the gear case and carries at one end the fast and loose pulleys 31, 32. 94 is a driven shaft mounted near either end in bearings 95, 96 on the gear case. At one end it carries the sprocket wheel 33, which is in vertical alinement with the sprocket wheel 34. 97, 98 and 99 are high speed, intermediate and low speed gear wheels respectively, rigidly secured to the driven shaft 94. The part of the drive shaft 29 between the bearings 91, 92 may be squared, as indicated at 29′ to receive a slidable sleeve 100 having a square passageway extending axially through it. 101, 102 and 103 are high, intermediate and low speed gears, respectively, on the sleeve 100. If desired these gear wheels and sleeve may be formed integral. 104 is an operating lever mounted on the sleeve 100. The rear wall of the gear case may be slotted, as shown at 105, to permit the adjustment longitudinally of the gear case of the lever 104 which extends through said slot. 106, 107 and 108 are recesses or notches extending downward from said slot 105 and arranged to receive and hold from lateral movement the lever 104 when it is adjusted to cause the driven shaft to be driven on high, intermediate and low speed respectively. 109 is a top or cover for the gear case. When it is desired to operate the agitating mechanism at the highest speed of which the apparatus is capable the lever 104 is shifted to cause the gear 101 to mesh with the gear 97 on the driven shaft. For the intermediate and low speeds, the lever 104 must be shifted to cause the gears 102 and 98 and the gears 103 and 99 to mesh, respectively.

I disclaim the combination with a freezer can having a discharge opening at one end, of a shaft therein, beater blades secured to said shaft and obliquely inclined thereto, spiders loosely mounted upon said shaft, means for rotating said shaft and spiders in opposite directions, scraper knives pivoted on diametrically opposite arms of said spiders and adapted to bear against the inner faces of the can, spirally arranged bars carried on the other arms of said spiders and traveling in the path of the scraper knives to force the material as scraped from the can toward said discharge opening, believing the same to be the invention of John C. Miller.

I disclaim as my invention the subject matter of the issues of interferences Nos. 30122, 30123, 30124, and 30125, declared on the 13th day of April, 1909, and to which I was made a party, believing John C. Miller, one of the parties to all of said interferences to be the original, sole and first inventor of the subject matter involved in the issues.

What I claim is:—

1. In an ice cream freezer, the combination of a vertically disposed freezing cylinder, agitating mechanism arranged within said freezing cylinder, a material supply tank arranged at a level lower than the top of said freezing cylinder, the top of said supply tank being below the top of said freezing cylinder and a duct leading from said supply tank to the interior of said freezing cylinder.

2. In an ice cream freezer, the combination of a vertically disposed freezing cylinder, suitable agitating mechanism arranged within said cylinder, a material supply tank arranged at one side of said cylinder and intermediate of its ends, the top of said supply tank being below the top of said freezing cylinder and a duct leading from said supply tank and communicating with the interior of said cylinder.

3. In an ice cream freezer, the combination of a vertically disposed freezing cylinder, suitable agitating mechanism arranged within said cylinder, an inlet duct for material arranged intermediate of the ends of said cylinder, and a material supply tank connected with said duct and arranged at one side of said cylinder and intermediate of its ends, the top of said supply tank being below the top of said freezing cylinder.

4. In an ice cream freezer, the combination of a vertically disposed freezing cylinder, agitating mechanism arranged within the cylinder, an inlet duct for material arranged intermediate the ends of said cylinder, a material supply tank arranged at one side of said cylinder and having a discharge duct connected with said inlet duct, and connections between the cylinder and the supply tank for supporting the latter in position.

5. In an ice cream freezer, the combination of a suitable base, a freezing cylinder vertically disposed upon said base, suitable agitating mechanism arranged within said cylinder, power transmitting mechanism connected with said agitating mechanism, a material-supply tank arranged at one side of said cylinder and intermediate of its ends, and a duct leading from said supply tank to the interior of said cylinder.

6. In an ice cream freezer, the combination of a suitable base, a freezing cylinder vertically disposed upon said base and having at its lower end a material-discharge opening, a valve for controlling said discharge opening, suitable agitating mechanism arranged within said cylinder, power transmitting mechanism connected with said agitating mechanism, an inlet duct for material communicating with the interior of said cylinder intermediate of its ends, and a material supply tank connected with said duct and arranged at one side of said cylinder and intermediate of its ends.

7. In an ice cream freezer, the combination of a suitable base, a freezing cylinder vertically disposed upon said base and having at its lower end a material-discharge opening, a valve for controlling said discharge opening, suitable agitating mechanism arranged within said cylinder, power transmitting mechanism connected with said agitating mechanism, an inlet duct for material communicating with the interior of said cylinder intermediate of its ends, a valve in the said duct, and a material supply tank connected with said duct and arranged at one side of said cylinder and intermediate of its ends.

8. In an ice cream freezer, the combination of a freezing cylinder, suitable agitating mechanism arranged within said freezing cylinder, a helically grooved cylinder surrounding said freezing cylinder and forming with the outer wall thereof a tortuous passageway for cooling medium, and an inlet duct arranged intermediate the ends of said cylinder and extending through said helically grooved cylinder and communicating with the interior of said freezing cylinder, said inlet duct intercepting portions only of two adjacent convolutions of said tortuous passageway for the cooling medium.

9. In an ice cream freezer, the combination of a suitable base, a freezing cylinder vertically disposed upon said base, suitable agitating mechanism within said freezing cylinder, a main drive shaft mounted upon said base adjacent to the lower end of said freezing cylinder, a counter shaft mounted above said main drive shaft and supported upon said base, power transmitting devices between said main drive shaft and said counter shaft, and power transmitting devices between the said counter shaft and the said agitating mechanism connected to the latter at the top of said freezing cylinder.

10. In an ice cream freezer, the combination of a suitable base, a freezing cylinder vertically disposed upon said base, suitable agitating mechanism within said freezing cylinder, a horizontally disposed main drive shaft mounted upon said base adjacent to the lower end of said freezing cylinder, a counter shaft mounted above said main drive shaft and supported upon said base, power transmitting devices between said main drive shaft and said counter shaft, a swingable gear frame mounted upon said counter shaft, a power transmitting shaft carried by said frame, power transmitting devices between said last described shaft and said counter shaft, and power transmitting devices between said last described shaft and the upper end of said agitating mechanism.

11. In an ice cream freezer mechanism, the combination of a base, a vertically disposed freezing cylinder mounted on said base, agitating mechanism in said cylinder, a standard, drive mechanism including change speed gearing carried by said standard intermediate its ends, a countershaft carried by the upper end of the standard and driven by said drive mechanism, and power transmitting devices between the countershaft and the said agitating mechanism.

12. In an ice cream freezer mechanism, the combination of a base, a vertically disposed freezing cylinder mounted on said base, agitating mechanism in said cylinder, a standard, drive mechanism including change speed gearing and a sprocket wheel carried by said standard intermediate its ends, a countershaft carried by the upper end of the standard and having a sprocket wheel in a substantially vertical line above the sprocket wheel of the drive mechanism, a chain connecting the said sprocket wheels whereby the countershaft is driven, and power transmitting devices between the countershaft and the said agitating mechanism.

13. In an ice cream freezer, the combination of a vertically disposed freezing cylinder, agitating mechanism arranged within said freezing cylinder, a gravity supply tank arranged at one side of said cylinder and having its top below the top of the freezing cylinder, and a substantially horizontal feed duct leading from said supply tank direct to the interior of said freezing cylinder.

14. In an ice cream freezer, the combination of a vertically disposed freezing cylinder, agitating mechanism arranged within said freezing cylinder, a gravity supply tank arranged at one side of said cylinder and having its top below the top of the freezing cylinder, a substantially horizontal feed duct leading from said supply tank direct to the interior of said freezing cylinder, and a support extending from said supply tank and connected to the freezing cylinder.

15. In an ice cream freezer, the combination of a vertically disposed freezing cylinder, agitating mechanism arranged within said freezing cylinder, a gravity supply tank arranged at one side of said freezing cylinder and having its top below the top of the freezing cylinder, and a feed duct leading from said supply tank to the interior of said freezing cylinder, the said feed duct being substantially in line with the bottom of said supply tank.

16. In an ice cream freezer, the combination of a freezing cylinder, agitating mechanism arranged within said freezing cylinder, means forming a tortuous passageway around said freezing cylinder, and an inlet duct arranged intermediate the ends of said cylinder and extending through said tortuous passageway and communicating with the interior of the freezing cylinder, said inlet duct intercepting portions only of two adjacent convolutions of said tortuous passageway for the cooling medium.

In testimony whereof I affix my signature, in presence of two witnesses.

LEROY S. PFOUTS.

Witnesses:
J. A. JEFFERS,
EDWARD R. ALEXANDER.

---

Copies of this patent may be obtained for five cents each, by addressing the "Commissioner of Patents, Washington, D. C."